United States Patent
Raczek

(10) Patent No.: US 7,392,251 B2
(45) Date of Patent: Jun. 24, 2008

(54) DEVICE AND METHOD FOR COMPARING DIGITAL TEXT DOCUMENTS

(75) Inventor: Andreas Raczek, Mainz (DE)

(73) Assignee: Schlafender Hase GmbH, Frankfurt am Main (DE)

( * ) Notice: Subject to any disclaimer, the term of this patent is extended or adjusted under 35 U.S.C. 154(b) by 337 days.

(21) Appl. No.: 11/009,645

(22) Filed: Dec. 9, 2004

(65) Prior Publication Data

US 2006/0129548 A1 Jun. 15, 2006

(51) Int. Cl.
*G06F 17/30* (2006.01)
(52) U.S. Cl. .................. 707/6; 707/3; 707/7; 715/234
(58) Field of Classification Search .............. 707/1–10, 707/100–104.1, 200–206; 715/513, 210, 715/231, 234
See application file for complete search history.

(56) References Cited

U.S. PATENT DOCUMENTS

| | | | | |
|---|---|---|---|---|
| 6,738,759 | B1 * | 5/2004 | Wheeler et al. | 707/3 |
| 7,146,564 | B2 * | 12/2006 | Kim et al. | 715/513 |
| 2006/0112068 | A1 * | 5/2006 | Zhang et al. | 707/1 |

OTHER PUBLICATIONS

Cooper et al., Detecting Similar Documents Using Salient Terms, Nov. 4-9, 2002, ACM, 245-251.*

Cho et al., Finding replicated web collections, 2000, ACM, 355-366.*

Myers, E.W.; And O(ND) Difference Algorithm and Its Variations; Algorithmica, vol. 1 (1986), pp. 251-266.

Heckel, P.; A Technique for Isolating Difference Between Files; Communications of the ACM, vol. 21(4). Apr. 1978, pp. 264-268.

* cited by examiner

*Primary Examiner*—Jean B Fleurantin
(74) *Attorney, Agent, or Firm*—Thelen Reid Brown Raysman & Steiner

(57) ABSTRACT

The invention relates to a method for comparing and analysing digital documents. The present invention is founded on the basic principle of searching for unambiguous roots in both documents. These roots are units which occur in both documents and in each case are unique. These roots can be individual words, word groups or other unambiguous textual formatting functions. There is then a search for identical roots in the respective other document (Root1 from Content1, and Root2 from Content2, with Root1=Root2). If a pair has been found, the area around these roots is compared until there is no longer any agreement. During the area search, both the preceding words and the subsequent words are analysed. The areas which are found in this way, Area1 around Root1 and Area2 around Root2, are stored in lists, List1 and List2, which are allocated to Doc1 and Doc2. This procedure is repeated until such time as no roots can be found any longer. The result is either a remaining area which has no overlaps, or complete identity of the documents.

13 Claims, 1 Drawing Sheet

DEVICE AND METHOD FOR COMPARING DIGITAL TEXT DOCUMENTS

The invention relates to a method for systematically comparing the contents of at least two digitally stored documents. The invention relates in particular to a method for comparing documents comprising different formatting and a different document format.

FIELD OF THE INVENTION

By using different document types and styles, such as for example Word and PDF, often a great deal of time, effort and expense is required to compare whether all the information in the source document is indeed present in the target document. Thus for example at the pre-printing stage, PDF is often used, wherein the source document is often available in RTF or DOC formats. A comparison by means of document software is possible only with considerable difficulty. Furthermore, a comparison of text documents with a free arrangement of the text passages in layers (or streams) such as e.g. in HTML or PDF, with text documents where the information in the text flow is arranged to accord with the flow of reading (e.g. TXT, RTF, DOC) or with other layer documents has so far not been possible in a satisfactory way.

STATE OF THE ART

In the state of the art, text-comparing algorithms monitor the document flow within the documents to be compared or try to reconstruct the flow of reading. In this process, any relocation of text passages is detected as cutting and pasting. In document files in which the document flow differs from the text flow, a large number of changes are thus shown, which are of no help to the user.

From the printed publication by Heckel, P: A Technique for Isolating Differences between Files, April 1978, a method for finding roots is known. This publication explains that apart from the mentioned lines, other units can be considered. In this process, the documents are being passed through in a linear manner from the front and from the back, with the allocation of the roots being transferred to their neighbouring elements, wherein in 5 linear passes agreements are found.

OBJECT OF THE INVENTION

It is the object of the invention to provide a method which makes it possible to achieve a relocation-resistant text comparison. Since the user should not be burdened with superfluous information, the comparison method should already separate any relocations from other modifications.

DESCRIPTION OF THE INVENTION

This object is met by the inventions with the characteristics of the independent claims. Advantageous improvements of the inventions are characterised in the subordinate claims.

The comparison method disclosed in the claims furnishes mutually allocated delimited areas which occur in both documents. By means of a suitable user interface, the user can quickly examine the position of these passages in both documents. It is thus possible to quickly visually display to the user both agreements and differences. This is substantially due to the use of lists as will be described below.

A further advantage consists of generating, from the administration of lists, a document that is oriented by the flow of reading, which document can be more easily acquired by the user. Thus the flow of reading of layer documents can be reconstructed by means of a comparison document which is oriented by the flow of reading.

If it was not possible to allocate some passages of a document, this indicates changes in relation to the original. By providing systematic or user-oriented analysis methods, by way of examining the environment in the document flow it is easily possible to detect whether the passages are individual words that have changed or whether they are new text passages or text passages that have been removed.

For comparing documents, at least two documents, Doc1 and Doc2, are present whose content is similar. As has already been described, the flow of reading can be similar to the document flow, or it can be divided into text passages without taking into account the flow of reading.

For technical implementation, the text contents (Content1 and Content2) are extracted from the documents Doc1 and Doc2 according to the document flow.

A basic starting point of the present invention is based on finding unambiguous roots in both documents.

These are units which occur in both documents and which in each case are unique. These roots can be individual words, groups of words or other unambiguous textual formatting functions. There is then a search for identical roots in the respective other document (Root1 from Content1, and Root2 from Content2, with Root1=Root2). If a pair has been found, the area around these roots is compared until there is no longer any agreement. During the area search, both the preceding words and the subsequent words are analysed.

The areas which are found in this way, Area1 around Root1 and Area2 around Root2, are stored in lists, List1 and List2, which are allocated to Doc1 and Doc2.

Finding pairs and comparing text areas is continued until such time as no new roots are found any longer. A search will only be done in non marked areas.

In particular constellations, the areas can be misallocated. For example, if in one document the root Root1 occurs once only while in the other document the root Root2 also occurs once only, this does not necessarily mean that the same text surrounds these roots Root1 and Root2. Instead, it may happen that Root2 is contained in the text but does not relate to the same area.

Expressed in a more formal way, roots can only have been misallocated if the corresponding part of Root1 is not present in Content2, and in turn a corresponding part of Root2 is not present in Content1. Root1 and Root2 would then happen to be identical.

If roots are misallocated, this can lead to areas within a document overlapping. Overlapping areas necessarily mean that roots have been misallocated.

Generally speaking one can assume that the probability of correct allocation increases as the area detected as being coherent increases.

A detailed instruction prescribes that when colliding areas are present in List1 and List2 respectively, the trustworthy areas, e.g. the smaller areas, are deleted with their partners in the respective other list. The remaining areas are finally connected to each other.

It must be pointed out that new roots can arise in the text passages which have not yet been connected to each other, because the now connected text passages no longer have to be taken into account.

If in the remaining areas there are roots again, the procedure described above is repeated. In this process, already connected text passages are not taken into account. Otherwise, processing of the documents is terminated.

An important aspect consists of the determination of roots, which determination comprises several options.

One option consists of treating the words or word groups of a document as root candidates. In this case a test is made in respect of all candidates to determine whether there are other candidates with an identical content in the same document. If this is the case, the candidate is invalid. The same process is carried out in respect of the comparison document. After this, for each candidate from the document, a search for the partner from the comparison document is made. If such a partner exists, the roots are allocated. The result of this is a list with root pairs.

Other ways of determining roots are also imaginable, such as for example character strings of a certain length, which character strings may also comprise blank characters.

In order to determine the complete segments, in the present invention, starting with the roots, a check is made whether the next elements in sequence (forward and rearward), e.g. sequential words, are identical in both documents. If this is no longer the case, the pair segments end. It may happen that several root pairs generate the same segment pairs, if a search for all the roots has been made in the front end.

Based on root allocation, other approaches are also possible, as described below.

In the single-pass, which is the fastest approach, but which only works well if neither of the documents has any overlapping areas, the found areas are all allocated in a single pass. The document parts which are not contained in the areas are then only contained in one document, and are thus different.

In order to check whether areas overlap, one can use various processes. In a possible embodiment, the words are numbered according to the document flow. By means of the number of the first and last word of an area, this area can be compared with other areas.

In a further embodiment, called multi-pass, first only that area is determined which has been evaluated as being the best area. All other areas are dissolved again and then determined anew, except for the determined area. For these areas the procedure is repeated. If there are no longer any overlapping areas left, the single-pass method can be used for the remainder.

Evaluation of the areas increases the probability of correct allocation when compared to the single-pass method. Allocating areas generates new roots in the remaining text (if a text element exists only once outside the determined area) and thus expands the old allocations or renders them invalid.

There are various user methods for evaluating whether a pair is good or bad, i.e. for the decision whether a pair should or should not be dissolved. One possible embodiment is based on the number of identical words found.

The complete/partial tree method is a method which involves a lot of effort but which as a rule yields the best possible result.

In this method, all possible combinations of regions are generated according to the multi-pass method. However, it is not individual regions that are being evaluated but instead the total result of all regions. The region combination with the best evaluation is marked as being correct.

To this effect it is easiest to take the number of words in the segment by way of evaluation. However, better evaluation methods are imaginable, right up to the use of word entropy.

Based on the evaluation function, this method provides the best-possible matching but it takes an exponentially large amount of time. For this reason, the number of possible regions can be reduced to the n best regions between the individual multi-pass steps.

BRIEF DESCRIPTION OF THE DRAWING

Below, the invention is explained in detail with reference to an embodiment which is diagrammatically shown in the figure Identical reference numbers in the individual figures designate identical elements. The following is shown.

PREFERRED EMBODIMENT

Figure 1:
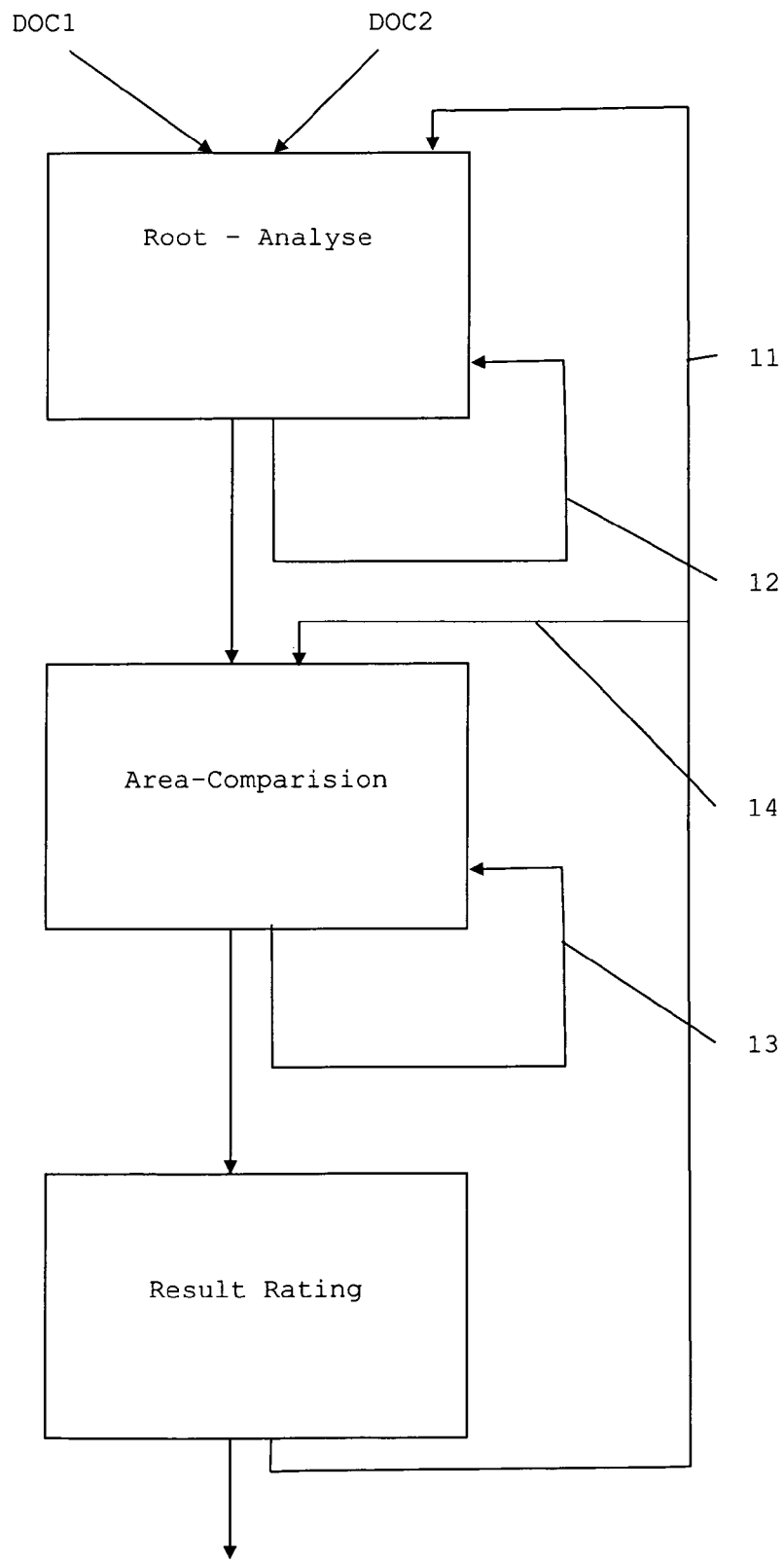
FIG. 1 a flow chart of the present invention.

According to FIG. 1, two documents, DOC1 and DOC2 are used for carrying out the root analysis. The root analysis can either be carried out once only, before an area analysis is carried out, or the root analysis can be carried out multiple times as is shown from connection 12.

If the analysis is carried out multiple times, then list structures are prepared which accommodate the root pairs. The area analysis can also be run multiple times, as is shown by the connection 13, provided a list structure with roots exists. After evaluation of the result, the process parts can either be carried out completely anew, in that areas are dissolved, or a search is made for new roots in order to then carry out the process anew. Depending on whether the multi-pass method or the complete/partial tree method, described in the claims, is used, evaluation of the result is different and leads to either a complete new start of the method, or a partial new start of the method.

What is claimed is:

1. A computer implemented method for systematically comparing contents of at least two digitally stored documents (Doc1, Doc2), which are stored on digital medium and which are loaded by a computer to be compared by a computer, wherein the stored documents (Doc1, Doc2) have marked and unmarked areas, wherein initially all the areas are unmarked, comprising the following steps:

a) searching for identical and unique roots (Root1, Root2) in the unmarked areas of the documents, of which there are at least two, wherein the roots comprise a string of text symbols, being in particular words, word groups or other unambiguous textual formatting functions, and must only occur exactly once in each of the documents, and wherein if a root is not unambiguous it is discarded, and wherein a search for the root is carried out in the first document in order to determine unambiguity, and then a search for the root is carried out in the second document in order to determine its unambiguity;

b) if roots have been found, comparing the documents, starting with the roots (Root1, Root2), until there is no longer any agreement, wherein the areas (Area1, Area2) found in this way are being marked;

c) repeating the above steps, starting with a) in a recursion until there are no longer any unique and identical roots or until no longer any found areas can be marked, wherein the marked areas are at first not taken into account in the search for roots and areas;

d) wherein a multi-pass method is used, in which after a first pass only one or several areas which are evaluated as being the best are determined, wherein all other areas are released and unmarked again and subsequently, at the exclusion of the determined area, are determined by new passes, starting with step a), wherein the information stored by the recursion are used.

2. The computer implemented method according to claim 1, wherein the areas Area1 around Root1 and Area2 around Root2, are stored in lists List1 and List2, which are allocated to Doc1 and Doc2.

3. The computer implemented method according to claim 1, wherein in the case of misallocated roots, which is indicated by areas within a document that overlap, and at least one of the areas is released and unmarked for a renewed root search.

4. The computer implemented method according to claim 3, wherein from colliding areas in List1 or List2 the more lowly evaluated partners in the respective other list are deleted.

5. The computer implemented method to claim 1, wherein a multi-pass method is used, in which after a first pass only one or several areas which are evaluated as being the best are determined, wherein all other areas are released and unmarked again and subsequently, at the exclusion of the determined area, are determined by new passes.

6. The computer implemented method to claim 1, wherein the single-pass method is used for the remaining areas if there are no longer any overlapping areas.

7. The computer implemented method according to claim 1, wherein a complete or partial tree method is used in which all possible combinations of areas are generated according to the multi-pass method, wherein the best combination is selected.

8. The computer implemented method according to claim 7, wherein not the individual regions that are evaluated but instead the overall result of all regions.

9. The computer implemented method according to claim 7, wherein the number of possible regions is reduced to the n best regions between the individual multi-pass steps.

10. The computer implemented method according to claim 1, wherein the roots are formed from one or several of the following characters: words, group of words, control characters.

11. The computer implemented method according to claim 1, wherein starting from the roots an area is examined in both directions for finding identical areas.

12. A data medium for a computer, characterised by storing a data structure with software according to claim 1 of the preceding method-related claims.

13. A computer system, characterised by a device which makes it possible to start and run a method according to the above method-related claim 1.

* * * * *